US011605918B2

United States Patent
Liniger et al.

(10) Patent No.: US 11,605,918 B2
(45) Date of Patent: Mar. 14, 2023

(54) PROTECTION DEVICE FOR A PLUG-IN CONNECTION

(71) Applicant: Endress+Hauser SE+Co. KG, Maulburg (DE)

(72) Inventors: Jeannette Liniger, Baden (CH); Robert Schmidt, Schopfheim (DE); Franco Ferraro, Schopfheim (DE); Gerd Bechtel, Steinen (DE); Willy Huwyler, Cham (CH)

(73) Assignee: Endress+Hauser SE+Co. KG, Maulburg (DE)

( * ) Notice: Subject to any disclaimer, the term of this patent is extended or adjusted under 35 U.S.C. 154(b) by 0 days.

(21) Appl. No.: 16/962,248

(22) PCT Filed: Dec. 17, 2018

(86) PCT No.: PCT/EP2018/085266
§ 371 (c)(1),
(2) Date: Jul. 15, 2020

(87) PCT Pub. No.: WO2019/137747
PCT Pub. Date: Jul. 18, 2019

(65) Prior Publication Data
US 2021/0066852 A1   Mar. 4, 2021

(30) Foreign Application Priority Data

Jan. 15, 2018   (DE) .......................... 102018100780.9

(51) Int. Cl.
*H01R 13/639*   (2006.01)
*H01R 13/516*   (2006.01)
*H01R 13/52*   (2006.01)

(52) U.S. Cl.
CPC ......... *H01R 13/639* (2013.01); *H01R 13/516* (2013.01); *H01R 13/5227* (2013.01)

(58) Field of Classification Search
CPC . H01R 13/639; H01R 13/516; H01R 13/5227
See application file for complete search history.

(56) References Cited

U.S. PATENT DOCUMENTS 2,511,906 A * 6/1950 Davis .................. H01R 13/639
                                                             403/335
2,715,654 A * 8/1955 Lucas .................... H01T 13/06
                                                             174/77 S (Continued)

FOREIGN PATENT DOCUMENTS

AU   2016203688 B1   12/2016
CN   86103655 A   11/1986

(Continued)

*Primary Examiner* — Neil Abrams
(74) *Attorney, Agent, or Firm* — Christopher R. Powers; Endress+Hauser (USA) Holding, Inc.

(57) ABSTRACT

The present disclosure relates to a protection device for a component of a releasable plug-in connection between a plug and a socket, which is arranged on or in a housing of an electronics unit of a field device. The protection device includes a first half shell and a second half shell at least partially complementary to the first half shell, wherein the two half shells are embodied as to define an internal volume when assembled and at least partially surround at least the plug, at least a first passageway for passage of the plug, or the plug and a cable secured to the plug, into the internal volume of the protection device, at least one securement unit for releasably securing the protection device to the housing, and at least one assembling unit for releasably assembling the two half shells with one another.

13 Claims, 4 Drawing Sheets

(56) References Cited

U.S. PATENT DOCUMENTS

| | | | | |
|---|---|---|---|---|
| 3,428,936 | A * | 2/1969 | Arnao, Jr. | H01R 13/6395 174/67 |
| 3,737,559 | A * | 6/1973 | Cooper, Jr. | H01R 4/70 174/92 |
| 3,960,427 | A * | 6/1976 | Piaget | H01R 4/70 439/892 |
| 4,169,643 | A * | 10/1979 | Gallagher | H01R 13/6392 439/369 |
| 4,281,214 | A * | 7/1981 | Miyamoto | H01F 27/04 200/19.38 |
| 4,437,719 | A * | 3/1984 | Miyamoto | F02P 7/08 439/350 |
| 4,998,894 | A * | 3/1991 | Gronvall | H01R 13/5216 439/936 |
| 5,080,598 | A * | 1/1992 | Shotey | H01R 13/5213 174/67 |
| 5,259,782 | A * | 11/1993 | Giffin | H01R 13/6392 439/314 |
| 5,306,176 | A * | 4/1994 | Coffey | H01R 13/6392 439/367 |
| 5,338,211 | A * | 8/1994 | Kodama | H01R 13/639 439/135 |
| 5,816,853 | A * | 10/1998 | Buekers | H02G 15/18 439/367 |
| 6,422,891 | B1 * | 7/2002 | Huang | F21V 23/06 362/249.01 |
| 6,881,901 | B2 * | 4/2005 | Egan | H02G 15/013 174/665 |
| 6,948,976 | B2 * | 9/2005 | Goodwin | H01R 13/512 439/607.41 |
| 6,955,558 | B1 * | 10/2005 | Low | H02G 15/18 439/587 |
| 7,798,837 | B1 * | 9/2010 | Gardner | G01G 23/017 174/92 |
| 8,476,540 | B2 * | 7/2013 | Dahl | H05K 5/0247 174/520 |
| 8,480,428 | B1 * | 7/2013 | Sper | H01R 13/5213 439/578 |
| 9,252,537 | B2 * | 2/2016 | Cox | H01R 13/639 |
| 9,583,867 | B2 * | 2/2017 | Bergum | H01R 13/523 |
| 9,608,361 | B2 * | 3/2017 | Vaccaro | H01R 13/5205 |
| 9,616,602 | B2 * | 4/2017 | Vaccaro | H01R 4/70 |
| 9,831,624 | B2 * | 11/2017 | Garvey | H01R 31/06 |
| 9,917,394 | B2 * | 3/2018 | Natoli | H01R 13/5213 |
| 10,457,317 | B2 * | 10/2019 | Takagi | B62D 5/0409 |
| 11,018,462 | B2 * | 5/2021 | Akagi | H01R 13/5202 |
| 2015/0303615 | A1 | 10/2015 | Daugherty, Jr. et al. | |
| 2021/0066852 | A1 * | 3/2021 | Liniger | H02G 3/081 |
| 2022/0363150 | A1 * | 11/2022 | Huang | H01R 13/502 |

FOREIGN PATENT DOCUMENTS

| | | |
|---|---|---|
| CN | 103094775 A | 5/2013 |
| CN | 105594071 A | 5/2016 |
| CN | 206864737 U | 1/2018 |
| DE | 102004029417 A1 | 3/2005 |
| GB | 2343302 A | 5/2000 |
| GB | 2343302 A1 | 5/2000 |
| JP | 2015210967 A | 11/2015 |
| WO | 2012141774 A1 | 10/2012 |
| WO | 2015058237 A1 | 4/2015 |
| WO | 2017205935 A1 | 12/2017 |

* cited by examiner

PROTECTION DEVICE FOR A PLUG-IN CONNECTION

CROSS-REFERENCE TO RELATED APPLICATIONS

The present application is related to and claims the priority benefit of German Patent Application No. 10 2018 100 780.9, filed on Jan. 15, 2018 and International Patent Application No. PCT/EP2018/085266, filed on Dec. 17, 2018, the entire contents of which are incorporated herein by reference.

TECHNICAL FIELD

The present invention relates to a protection device for a plug-in connection between a plug and a socket. Especially, the plug-in connection is a releasable plug-in connection. The socket is arranged, at least partially, in a housing, for example, of an electronics unit, preferably of a field device.

BACKGROUND

Field devices serve for monitoring and/or determining at least one, for example, chemical or physical, process variable of a medium. In the context of the present invention, in principle, all measuring devices are referred to as field devices, which are applied near to the process and which deliver, or process, process relevant information, thus, also remote I/Os, radio adapters, and, generally, electronic components, which are arranged at the field level. A large number of such field devices are produced and sold by companies of the Endress +Hauser group.

For example, the field device can be a fill level measuring device, flowmeter, pressure- and temperature measuring device, pH- and/or pH-redox potential measuring device, and even a conductivity measuring device, which serves for registering a process variable, such as fill level, flow, pressure, temperature, pH value, redox potential, or conductivity of the medium. The measuring principles underpinning the different types of field devices are all sufficiently known from the state of the art and are not individually set forth here. In the case of flowmeters, such are, especially Coriolis, ultrasonic, vortex, thermal and/or magnetically inductive flowmeters. Fill level measuring devices, in turn, are especially embodied as microwave, fill level measuring devices, ultrasonic, fill level measuring devices, time domain reflectometric, fill level measuring devices (TDR), radiometric, fill level measuring devices, capacitive, fill level measuring devices, conductive, fill level measuring devices and/or temperature sensitive, fill level measuring devices. In the case of pressure measuring devices, such involve preferably absolute, relative and differential pressure measuring devices, while a temperature measuring device, in turn, frequently has a thermocouple or a temperature dependent resistance for ascertaining the temperature.

A field device comprises a sensor unit coming at least partially and at least at times in contact with the process and an electronics unit, which serves, for example, for signal registration, evaluation and/or feeding. At least the electronics unit of a field device is typically arranged in a housing and has usually at least one contacting element. There are field devices, in the case of which the electronics unit is arranged together with the sensor unit. Alternatively, the electronics unit and sensor unit can, however, also be embodied in the form of separate units.

In the case of the at least one contacting element, it is usually a socket of a plug-in connection, which serves for contacting the field device with an additional unit, for example, an external unit, such as a process control station, a power supply unit, and even the sensor unit of the field device, by means of a cable, which is equipped with a plug complementary to the socket.

For the housing and plug connections for contacting the electronics unit, there are the most varied of embodiments, depending on the type of field device, thus, depending on the process variable to be determined and/or monitored and/or depending on the application or use contemplated for the field device. In such case, different, especially application-specific, requirements play a deciding role. Field devices, which are also to be operated in explosion endangered regions, must satisfy, for example, high safety requirements as regards explosion protection. In this regard, different explosion protection types and explosion zones are distinguished, wherein the different requirements are set forth, for example, in the European ATEX Directive or the North American NEC Code as well as the IEC, or NEC standards based thereon.

For example, of concern is safely to prevent the forming of sparks or at least to assure that a spark arisen upon malfunction has no effects on the surroundings.

Regarding the plug-in connections used for various applications, relevant concerns include whether the plug-in connection is protected against the penetration of foreign bodies, especially solid particles, for example, dust, whether it can pass a mechanical impact test, and, especially, whether, after a mechanical impact, protection against the penetration of foreign bodies still exists. Especially, the plug-in connection must not break upon the exertion of an external force (e.g. 4J or 7J).

SUMMARY

An object of the present invention is to embody a plug-in connection in such a manner that it has a high mechanical stability.

The object is achieved by a protection device for at least one component of a plug-in connection, especially a releasable plug-in connection, between a plug and a socket, which is arranged, at least partially, on or in a housing, especially of an electronics unit, preferably of a field device.

The protection device of the invention comprises at least a first half shell and a second half shell, wherein the second half shell is at least partially complementary to the first half shell, wherein the two half shells are embodied in such a manner that they define an internal volume when assembled and at least partially surround at least the plug, or the plug and the socket, at least a first passageway for passage of the plug, or the plug and a cable secured to the plug, into the internal volume of the protection device, at least one securement unit for securing, especially releasably securing, the protection device to the housing, and at least one assembling unit for assembling, especially releasably assembling, the two half shells with one another.

The protection device, thus, at least partially, surrounds the plug-in connection. Especially, the protection device can advantageously be placed subsequently on an existing, especially releasable, plug-in connection, especially likewise releasably. In this way, the protection device can be removed at any time, e.g., when the plug-in connection is to be disconnected. Likewise advantageously, however, just the protection device can be individually replaced. Preferably, first the plug and the socket are connected together, and then the protection device installed, in order to serve for protecting the plug-in connection. In such case, provided can be both a mechanical protection function, as well as also a protection relative to the penetration of foreign bodies, for example, dust particles, into the plug-in connection.

The two half shells are preferably made of a metal, a plastic, especially a thermoplastic plastic, or even a synthetic resin.

The protection device offers an increased safety of the plug-in connection. In the case, in which the plug-in connection is mountable to a housing of a field device, the field device is preferably embodied for operating in an explosion endangered atmosphere. For example, an application of the field device according to the ignition protection type dust-Ex can be assured. Electrical devices, which are embodied according to this protection class, are, for example, based on housing protection assuring that no dust can enter into the housing. Dust can lead to an explosion, for example, in connection with an ignition source, for example, electrical contacts, arranged in a housing. Another demand on the use of a device in explosion endangered surroundings relates to shock, or impact, resistance. The housing must not be damaged by an impact, thus, by action of an external force. A sufficient state of closure and mechanical strength must, thus, be assured, this being likewise achieved by application of a protection device of the invention.

An embodiment provides that the passageway is part of at least one of the two half shells.

Advantageously, the first passageway is an, especially circularly round, opening in a wall of one of the two half shells. Alternatively, however, it is also an option that each of the two half shells has a cutout, especially an equally embodied cutout, in an edge region of a wall, wherein the two cutouts are embodied in such a manner, especially embodied complementary relative to one another, that they form the first passageway in the assembled state of the half shells. In the assembled state of the protection device, the two half shells then form, for example, an, especially circularly round, opening, which serves as passageway. In the case that a plurality of passageways are provided, the additional passageways can be embodied both analogously to, as well as also differently from, the first passageway.

Another embodiment includes that the securement unit is part of at least one of the two half shells. The securement unit can especially be embodied in such a manner that it is placeable or securable on one of the two half shells. Alternatively, an option is that at least a first component of the securement unit is placeable or securable on the first half shell, while at least a second component of the securement unit is placeable or securable on the second half shell.

Advantageously, the securement unit is embodied at least partially complementary to the housing in the region of the socket. Especially, the securement unit is embodied in such a manner that the protection device can be plugged onto a portion of the housing, or is securable or placeable on a portion of the housing.

It is likewise advantageous that the securement unit be embodied in such a manner that the protection device is securable by force and/or shape interlocking onto the housing. Force and/or shape interlocking securement of the protection device with the housing can provide an increased mechanical stability, especially against mechanical impacts on the plug-in connection, or the protection device.

For example, the securement unit can be embodied in at least one portion of at least one component of the protection device, especially at least one of the two half shells, complementary to a portion of the housing, on which the protection device is to be secured. Especially, the portion of the protection device is embodied in an inner region complementarily to an outer region of the portion of the housing.

An embodiment includes that the assembling unit is a unit for producing a screwed assembly, a catch mechanism, or a lead sealing of the two half shells with one another. Especially, the protection device can be embodied in such a manner that an assembling of the two half shells by means of the assembling unit leads simultaneously to a securement of the half shells to the housing. Such can especially be achieved by a suitable positioning of the securement unit relative to the assembling unit.

In the case, in which a screwed assembly is producible by means of the assembling unit, the assembling unit includes, for example, at least one screw, and at least one screw thread in at least one component of the protection device. Preferably, such an assembling unit includes at least two screws, which are arranged on opposite sides of the half shells and serve for releasable assembling of the two half shells with one another.

In an additional embodiment, the plug-in connection is an M12 plug-in connection.

An embodiment provides that at least one of the half shells has a rib structure, especially in an inner region. A rib structure serves to increase mechanical stability.

In an additional embodiment, the protection device includes an opening, through which moisture can leave the internal volume of the protection device. Moisture reaching the internal volume of the protection device can, thus, escape through the opening.

Advantageously, at least one of the two half shells is made of a transparent material. On the one hand, in this way, it can be checked whether the plug is correctly plugged into the socket. Moreover, it can, in given cases, be assured that light emitting elements, for example, LEDs, located in the region of the plug-in connection or on the housing remain visible to the outside in spite of the applying of a protection device. Such LEDs are often applied on electronic units, especially field devices, in order, for example, to signal certain functionalities of the electronics unit, or the field device and even for indicating the presence of defects.

It is likewise advantageous that a thickness of the wall of at least one of the two half shells is at least sectionally variable, especially wherein the thickness of the wall is lessened in a predeterminable portion. Such is especially advantageous when the half shells are made of a transparent material. In such case, the thickness of the wall can be sectionally selected in such a manner that the half shells serve as light conductors for light emitting elements employed in the region of the plug-in connection or in the region of the housing and for an improved visibility of the display of the light emitting elements to the outside. The wall of the half shells is then especially embodied in such a manner that, in the state of the protection device secured on the housing, portions of the wall with reduced thickness (or increased thickness) are arranged in the region of light emitting elements.

A preferred embodiment of the protection device includes that the first passageway is arranged in the region of a wall formed by the half shells on a side opposite the securement unit. Such an arrangement of the passageway is suited for a plug-in connection, in which a straight plug is used.

A preferred alternative embodiment of the protection device includes, in contrast, that the first passageway is arranged in the region of a wall formed by the half shells and extending at a predeterminable angle, especially perpendicularly, to a plane in parallel with the securement unit. Such an arrangement of the passageway is, in turn, suited especially for angle plugs, especially plugs formed as a right angle.

In an especially preferred embodiment, the protection device includes, finally, at least two, preferably three, passageways, wherein the first passageway is arranged in the region of a wall formed by the half shells on a side opposite the securement unit, wherein a second passageway is arranged in the region of a wall formed by the half shells and extending at a predeterminable angle, especially perpendicularly, to a plane in parallel with the securement unit, and wherein preferably a third passageway is arranged in the region of a wall formed by the half shells and extending perpendicularly to a plane in parallel with the securement unit and opposite to the second passageway. The providing of a plurality of passageways achieves that one and the same protection device can be used universally for straight and angle plugs. In the case, in which three passageways are provided, it is especially advantageously possible, due to the symmetry resulting therefrom, to produce the two half shells by means of the same tool. This, in turn, significantly reduces the manufacturing complexity and, associated therewith, the costs of the manufacture.

The object of the invention is achieved, furthermore, by a field device, especially of process measurements technology, comprising a sensor unit and an electronics unit at least partially arranged in a housing, and a protection device of the invention according to at least one of the above described embodiments.

BRIEF DESCRIPTION OF THE DRAWINGS

The invention will now be explained in greater detail based on examples of embodiments illustrated in the appended drawing, the figures of which show as follows.

Figure 1:
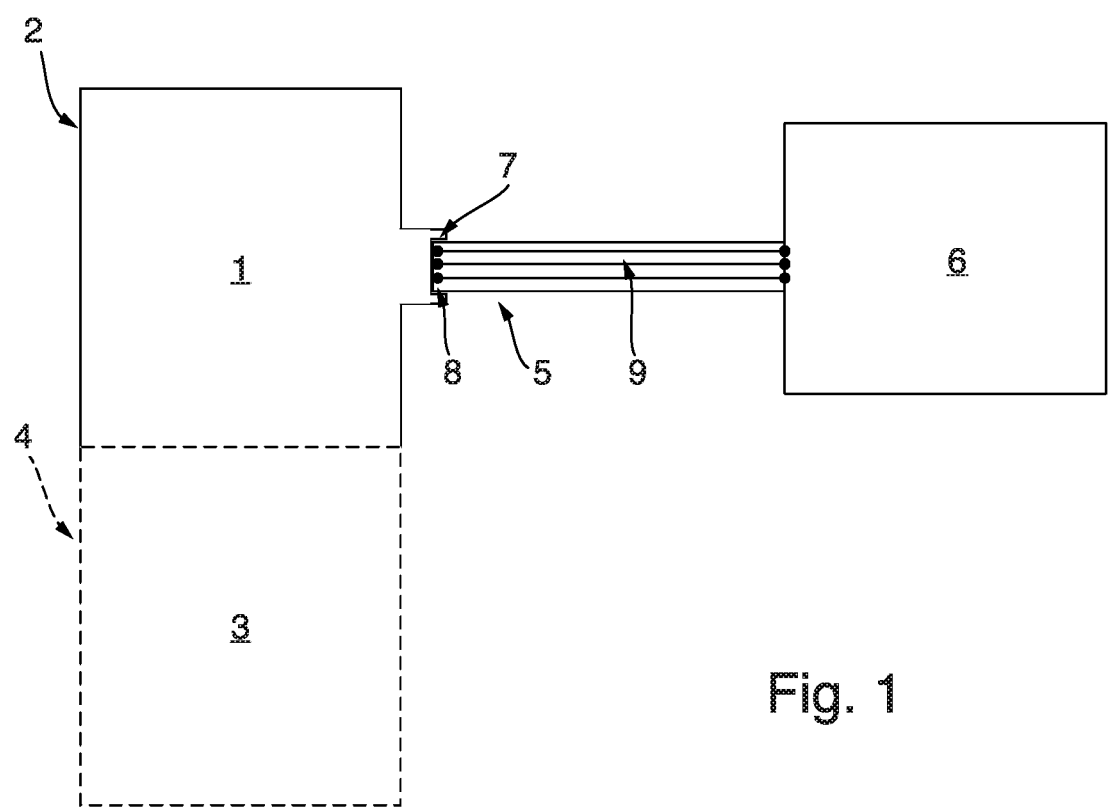
FIG. 1 shows a schematic view of an electronics unit arranged in a housing with a plug-in connection.

In the figures, equal elements are provided with equal reference characters.

DETAILED DESCRIPTION

FIG. 1 shows a schematic view of an electronics unit 1 arranged in a housing 2. For example, however, not necessarily, the electronics unit 1 is the electronics unit 1 of a field device 4, which includes a sensor unit 3 (dashed lines) connected with the electronics unit 1.

The electronics unit 1 is connected via a plug-in connection 5 with an external unit 6, which can be, for example, a process control station. Instead of the external unit 6, the electronics unit 1 can be connected via the plug-in connection 5 with another device (not shown). The other device connectable with the electronics unit 1 via a cable 9 and a plug-in connection 5 device can be any device.

Arranged on the housing 2 is a socket 7 of the plug-in connection 5. For this, the housing 2 includes a projection 2a, in which the socket 7 is accommodated. Of course, also other embodiments of the housing 2 and the socket 7 provide options. Plugged into the socket 7 is a plug 8 complementary to the socket 7. Plug 8 terminates a cable 9, which is likewise connected with the external unit 6. The present example shows a three pole, plug-in connection. Of course, also numerous other plug connections, especially also such with some other number of poles, can be used in the context of the present invention.

For increasing the mechanical stability of a plug-in connection 5, the present invention provides the use of a protection device 10. Especially in the case of application of the electronics unit 1 in an explosion endangered region, it is necessary that the plug-in connection 5 can withstand mechanical impact. The plug-in connection 5 must especially not break as a result of application of an external force. Also, the plug-in connection must remain protected after a mechanical impact against the penetration of foreign bodies.

The following figures describe, by way of example, preferred embodiments for the protection device 10 of the invention.

Figure 2A:
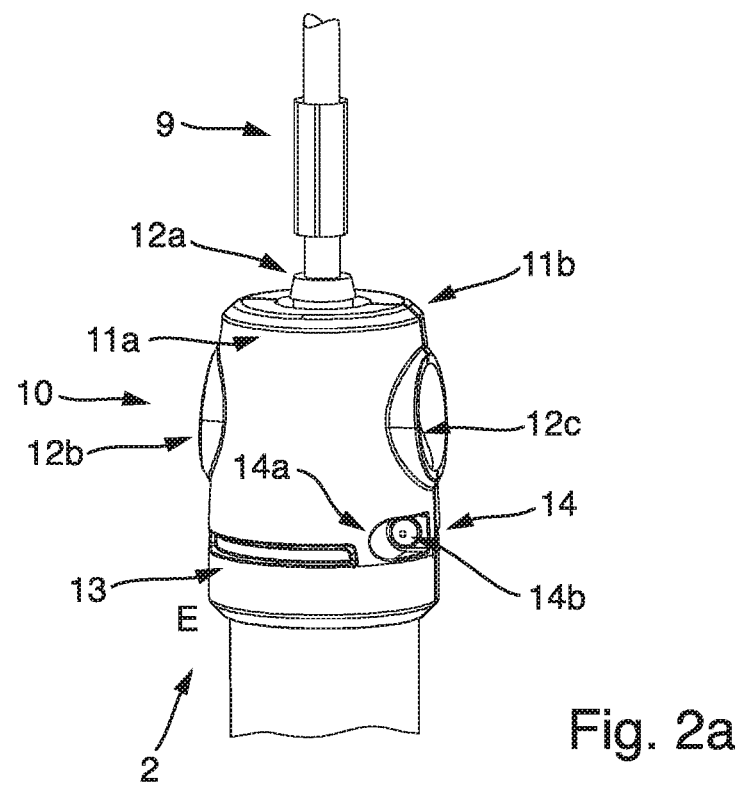
FIGS. 2a and 2b show embodiments of the protection device of the present disclosure for a straight plug.
Figure 2B:
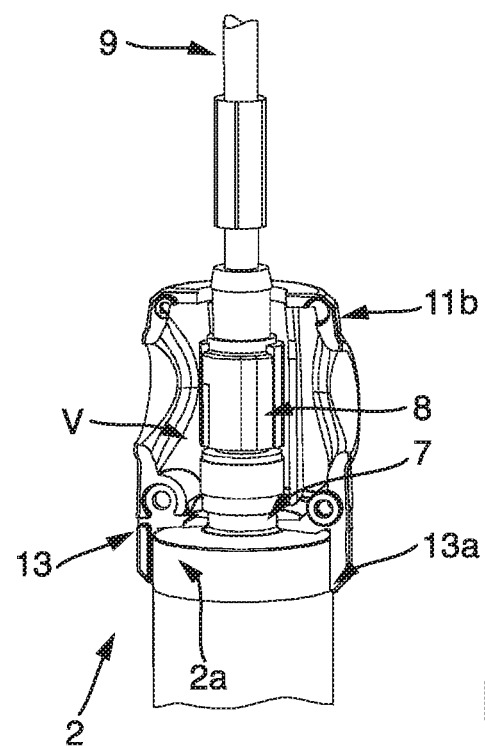

FIG. 2 shows a first embodiment of a protection device 10 for a plug-in connection 5 having a straight plug 8. Protection device 10 includes two mutually complementary half shells 11a and 11b, which are assemblable releasably with one another by means of the assembling unit 14. In the assembled state, the two half shells 11a and 11b form an internal volume V, such as shown in FIG. 2b, which surrounds the socket 7 and the plug 8 of the plug-in connection 5.

The assembling unit 14 comprises, in the embodiment shown here, means for producing a screwed assembly. The two half shells 11a and 11b have two mutually complementary bores 14a, 14a' (only one is shown in FIG. 2) arranged on opposite sides and equipped with threads (not shown), in which screws 14b, 14b' (likewise only one is shown) can be introduced for establishing the assembly of the two half shells 11a and 11b.

With the securement unit 13, in the present case, a form and force interlocking securing of the protection device 10 to the housing 2 can be achieved. As best seen in FIG. 2b, the two half shells 11a and 11b are, in each case, embodied in a portion 13a, 13a' (only half shell 11b shown in FIG. 2b) complementarily to a part 2a of the housing 2, to which part 2a the protection device 10 is attached or secured.

The two half shells 11a and 11b have, furthermore, a first passageway 12a for passage of the plug 8 into the internal volume V of the protection device 10. In the example shown here, each of the two half shells 11a, 11b includes for this purpose a cutout in an edge region of a wall, wherein the two cutouts are embodied in such a manner, and, especially complementary relative to one another, that they form the first passageway 12a in the assembled state of the half shells 11a,11b. In the example of FIG. 2, the first passageway 12a is arranged in the region of a wall formed by the half shells 11a,11b on a side opposite the securement unit 13.

As shown in FIG. 2, although not absolutely necessary, the protection device 10 includes, besides the first passageway 12a, a second 12b and a third passageway 12c, each of which extends, or extend, on opposite sides of a wall of the protection device 10, or walls of the two half shells 11a, 11b, perpendicularly to a plane E in parallel with the securement unit 13.

In the present example of a straight plug connection, no plug 8 or connection cable 9 is led through either of these two additional passageways 12b, 12c. In another embodiment, the second 12b and/or the third passageway 12c can also be omitted.

Figure 3A:
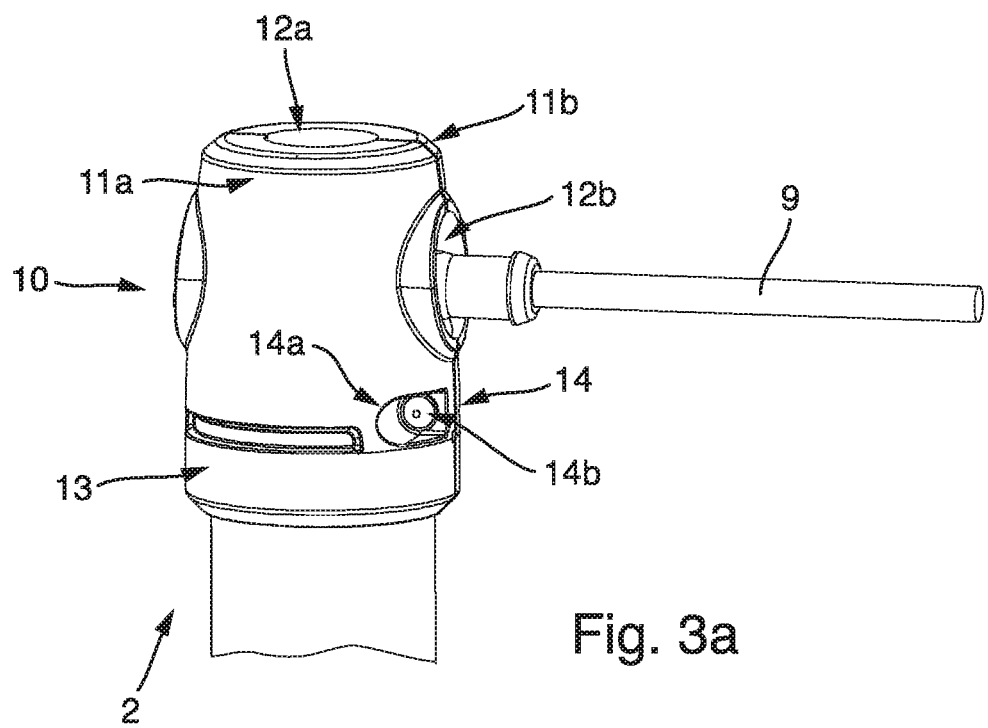
FIGS. 3a and 3b show embodiments of the protection device of the present disclosure for a 90-degree angle plug.
Figure 3B:
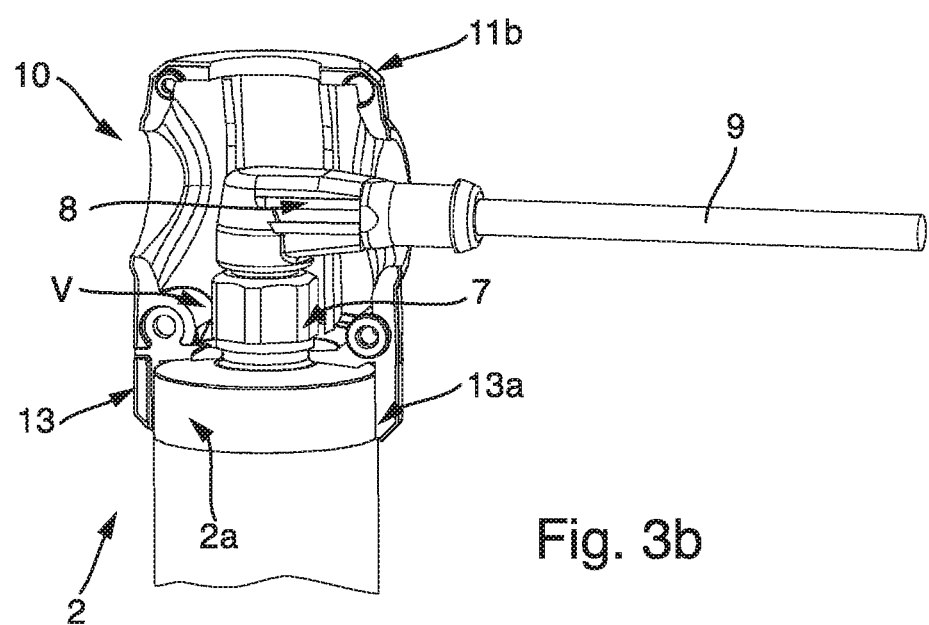

An embodiment of the protection device 10 with a 90-degree angle plug 8 is shown in FIG. 3. As in FIG. 2, FIG. 3a is a perspective view of the protection device 10, while in FIG. 3b a sectional illustration is provided. Reference characters already explained in connection with FIG. 2 are not explored anew in detail for FIG. 3. In contrast with FIG. 2, FIG. 3 shows the plug 8 led through the third passageway 12c into the internal volume V of the protection device 10. In the case of the embodiment of FIG. 3, the first 12a and second passageways 12b are optional and can also be omitted in other embodiments. Furthermore, it is likewise an option to lead the angle plug 8 through the second passageway 12b, in such a manner that the first 12a and third passageway 12c remain unused.

Figure 4A:
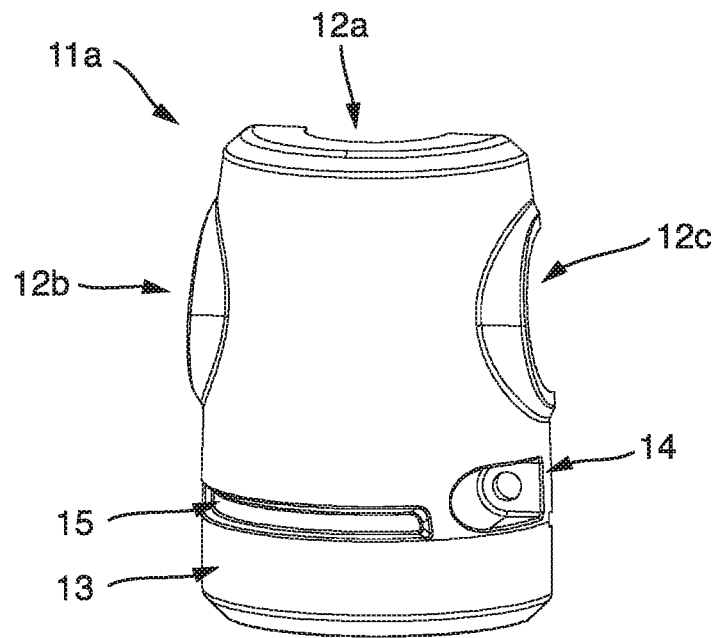
FIGS. 4a and 4b show perspective views of two half shells of the protection device.
Figure 4B:
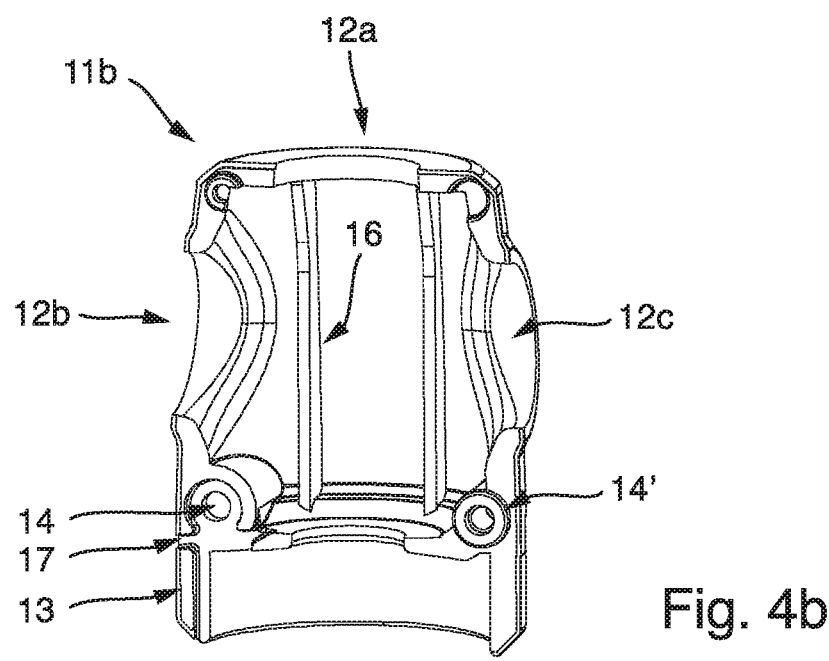

A perspective view of the two half shells 11a and 11b of the protection device 10 is, finally, shown in FIG. 4. FIG. 4a shows the first half shell 11a in such a manner that an outer region of the half shell 11a is visible. For the second half shell 11b shown in FIG. 4b, in contrast, an inner region of the half shell 11b is shown. Again the three passageways 12a-12c of the protection device 10 are provided, which are formed by mutually complementary cutouts in the walls of the two half shells 11a and 11b. An advantage of an embodiment of the protection device 10 with three passageways 12a-12c is that the protection device 10 can be used universally both for straight as well as also for angle plugs 8. Moreover, such a protection device 10 is distinguished by a high degree of symmetry. It is, for example, advantageous that the three passageways 12a-12c of the two half shells 11a and 11b are manufacturable with the same tool.

The two half shells 11a and 11b of FIG. 4 have in their inner regions, in each case, a rib structure 16, which is shown in FIG. 4b. This serves for increasing the mechanical stability of the protection device 10. Furthermore, the protection device 10 of FIG. 4 has an opening 17, through which moisture, which has penetrated into the internal volume V of the protection device 10, can escape from the protection device 10. Opening 17 in the present example is in half shell 11a and/or 11b. Thus, for example, an opening 17 in a wall of one of the two half shells 11a, 11b is an option, as well as also an embodiment of half shells 11a and 11b with two mutually complementary passageways in the region of an outer wall, which in the assembled state of the two half shells 11a and 11b form the opening 17.

Furthermore, the thickness d of the walls of the two half shells 11a and 11b is lessened in a portion 15. Such is especially advantageous when half shells 11a and 11b are produced from a transparent material, such as should be assumed for the example of an embodiment shown in FIG. 4. Due to the use of transparent material, it can be assured that at least one light emitting element (not shown) applied in the region of the plug-in connection 5 or the housing 2 remains externally visible, in spite of the applying of the protection device 10 on the housing 2. The half shells 11a and 11b serve then in the portion 15 as a light conductor for the light radiated from the light emitting element and conduct the rays suitably to an observer.

The invention claimed is:

1. A protection device for at least one component of a releasable plug-in connection between a plug and a socket, which socket is disposed, at least partially, on or in the housing of the electronics unit, the protection device comprising:
   a first half shell and a second half shell, wherein the second half shell is at least partially complementary to the first half shell, and wherein the first half shell and the second half shell are configured as to define an internal volume when assembled together and to at least partially surround at least the plug;
   a first passageway and a second passageway, each defined in a wall formed by the first and second half shells in assembly and configured to enable passage of the plug, or the plug and at least a portion of a cable attached to the plug, into the internal volume;
   a securement member configured to releasably secure the protection device to the housing by form and force interlocking with a portion of the housing such that the plug-in connection meets the impact and mechanical shock requirements of an ATEX, IEC or NEC explosion protection standard, and wherein the securement member is included in at least one of the first and second half shells; and
   an assembling member configured to releasably assemble the first and second half shells together,
   wherein the first passageway is defined in a region of a wall on a side opposite the securement member, and wherein the second passageway is defined in another region of the wall and extends at an angle perpendicular to a plane parallel with the securement member.

2. The protection device of claim 1, wherein:
   the first passageway is a substantially circular opening in the wall; and
   each of the first and second half shells includes a cutout in an edge region of the wall, wherein each cutout is complementary relative to the other cutout as to form the first passageway when the first and second half shells are assembled together.

3. The protection device of claim 1, wherein the securement member is configured to be at least partially complementary to the housing in a region about the socket.

4. The protection device of claim 1, wherein the assembling member is configured as a screwed assembly, a catch mechanism, or a lead seal of the first and second half shells to one another.

5. The protection device of claim 1, wherein the plug-in connection is an M12 plug-in connection.

6. The protection device of claim 1, wherein at least one of the first and second half shells includes a rib structure in an inner region thereof.

7. The protection device of claim 1, wherein the protection device includes an opening through which moisture can leave the internal volume of the protection device.

8. The protection device of claim 1, wherein at least one of the first and second half shells is made of a transparent material.

9. The protection device of claim 1, wherein a thickness of a wall of at least one of the first and second half shells is at least sectionally variable such that the thickness is lesser in a portion of the wall.

10. The protection device of claim 1, wherein the first passageway extends at an angle to a plane parallel with the securement member.

11. The protection device of claim 1, wherein the angle is perpendicular to a plane in parallel with the securement member.

12. The protection device of claim 1, further comprising a third passageway disposed in a further region of the wall formed by the first and second half shells, extending perpendicular to the plan parallel with the securement member and opposite the second passageway.

13. A field device comprising:
   a sensor;
   an electronics unit disposed within a housing and connected to the sensor; and
   the protection device of claim 1.

* * * * *